United States Patent
Chen

(10) Patent No.: US 8,199,214 B2
(45) Date of Patent: Jun. 12, 2012

(54) CAMERA DEVICE AND IMAGE PROCESSING METHOD

(75) Inventor: Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 279 days.

(21) Appl. No.: 12/783,644

(22) Filed: May 20, 2010

(65) Prior Publication Data

US 2011/0134281 A1    Jun. 9, 2011

(30) Foreign Application Priority Data

Dec. 4, 2009   (TW) .............................. 98141474 A

(51) Int. Cl.
*H04N 5/228* (2006.01)
*G06K 9/00* (2006.01)
*G09G 5/02* (2006.01)

(52) U.S. Cl. ...................... 348/222.1; 382/162; 345/603; 345/604

(58) Field of Classification Search .............. 348/222.1; 345/603, 604; 382/162
See application file for complete search history.

(56) References Cited

U.S. PATENT DOCUMENTS

| | | | |
|---|---|---|---|
| 2004/0113917 A1* | 6/2004 | Matsumoto | 345/589 |
| 2005/0062756 A1* | 3/2005 | Dyke et al. | 345/604 |
| 2008/0075394 A1* | 3/2008 | Huang et al. | 382/300 |
| 2010/0232518 A1* | 9/2010 | Coleman, Sr. | 375/240.26 |

* cited by examiner

*Primary Examiner* — Sinh Tran
*Assistant Examiner* — Christopher K Peterson
(74) *Attorney, Agent, or Firm* — Thomas|Kayden

(57) ABSTRACT

The invention provides a camera device. In one embodiment, the camera device comprises a sensor and a controller. The sensor detects an image to generate a first image signal with an RGB format. The controller comprises an image processor and a subsequent processor. The image processor converts the first image signal to a second image signal with a YUY2 format. The subsequent processor adjusts a plurality of luma components, a plurality of first chroma components, and a plurality of second chroma components of the second image signal to obtain a plurality of adjusted luma components, a plurality of first adjusted chroma components, and a plurality of second adjusted chroma components of a third image signal. A host receives the third image signal output by the camera, and uses a Direct Show module to convert the third image signal to a fourth image signal with an RGB format.

16 Claims, 5 Drawing Sheets

CAMERA DEVICE AND IMAGE PROCESSING METHOD

This Application claims priority of Taiwan Patent Application No. 98141474, filed on Dec. 4, 2009, the entirety of which is incorporated by reference herein.

BACKGROUND OF THE INVENTION

1. Field of the Invention

The invention relates to camera devices, and more particularly to image processing of camera devices.

2. Description of the Related Art

A Direct Show program is an application programming interface produced by Microsoft for software developers to perform various operations with media files or streams. A Windows system developer can use the Direct Show program to play or record media files. Ordinarily, a Direct Show program is often used to receive video data generated by a camera and show the video data on a screen coupled to a host. In addition, the Direct Show program is also a component program of a Windows Media Player for playing multi-media files.

A host executing a Direct Show program receives video data of a variety of formats from a camera. Ordinarily, a camera device can output video data of a YUV format or a motion joint photographic experts group (MJPG) format. According to the YUV format, a pixel of an image is divided into a luma component and two chroma components. The YUV format is further divided into Y'UV, YUV, YCbCr, YPbPr, and YUY2 formats, the difference between which is the numbers of luma components and chroma components for representing a pixel. According to the MJPG format, pixels of an image are compressed and encoded to reduce the data amount of the image. The host must therefore decode image data of the MJPG format before the host shows the image data of the MJPG format.

When the host shows the image data with the MJPG format on a screen, the luminance and chrominance of the image data shown on the screen differ from those of an image of a YUY2 format. A screen generally can only receive image data with a RGB format. A host therefore must convert image data to the RGB format before the image data is shown on the screen. The Direct Show program provided by Microsoft, however, converts image data of a YUY2 format and an MJPG format to image data of a RGB format with different transform coefficients, leading to difference of luminance and chrominance of the image data converted from the YUY2 format and the MJPG format. To make image data converted from the YUY2 format and the MJPG format have the same luminance and chrominance, a camera device capable of adjusting the luminance and chrominance of output image data is therefore required.

BRIEF SUMMARY OF THE INVENTION

The invention provides a camera device. In one embodiment, the camera device is coupled to a host, and comprises a sensor and a controller. The sensor detects an image to generate a first image signal with an RGB format. The controller comprises an image processor and a subsequent processor. The image processor converts the first image signal to a second image signal with a YUY2 format. The subsequent processor adjusts a plurality of luma components, a plurality of first chroma components, and a plurality of second chroma components of the second image signal to obtain a plurality of adjusted luma components, a plurality of first adjusted chroma components, and a plurality of second adjusted chroma components of a third image signal. The host receives the third image signal output by the camera, uses a Direct Show module to convert the third image signal to a fourth image signal with an RGB format, and outputs the fourth image signal to a screen.

The invention provides an image processing method. In one embodiment, a camera device is coupled to a host. First, an image is detected by a sensor to generate a first image signal with an RGB format. The first image signal is then converted by an image processor to a second image signal with a YUY2 format. A plurality of luma components, a plurality of first chroma components, and a plurality of second chroma components of the second image signal are then adjusted by a subsequent processor to obtain a plurality of adjusted luma components, a plurality of first adjusted chroma components, and a plurality of second adjusted chroma components of a third image signal. The third image signal is then transmitted to the host. The host receives the third image signal output by the camera, uses a Direct Show module to convert the third image signal to a fourth image signal with an RGB format, and outputs the fourth image signal to a screen.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
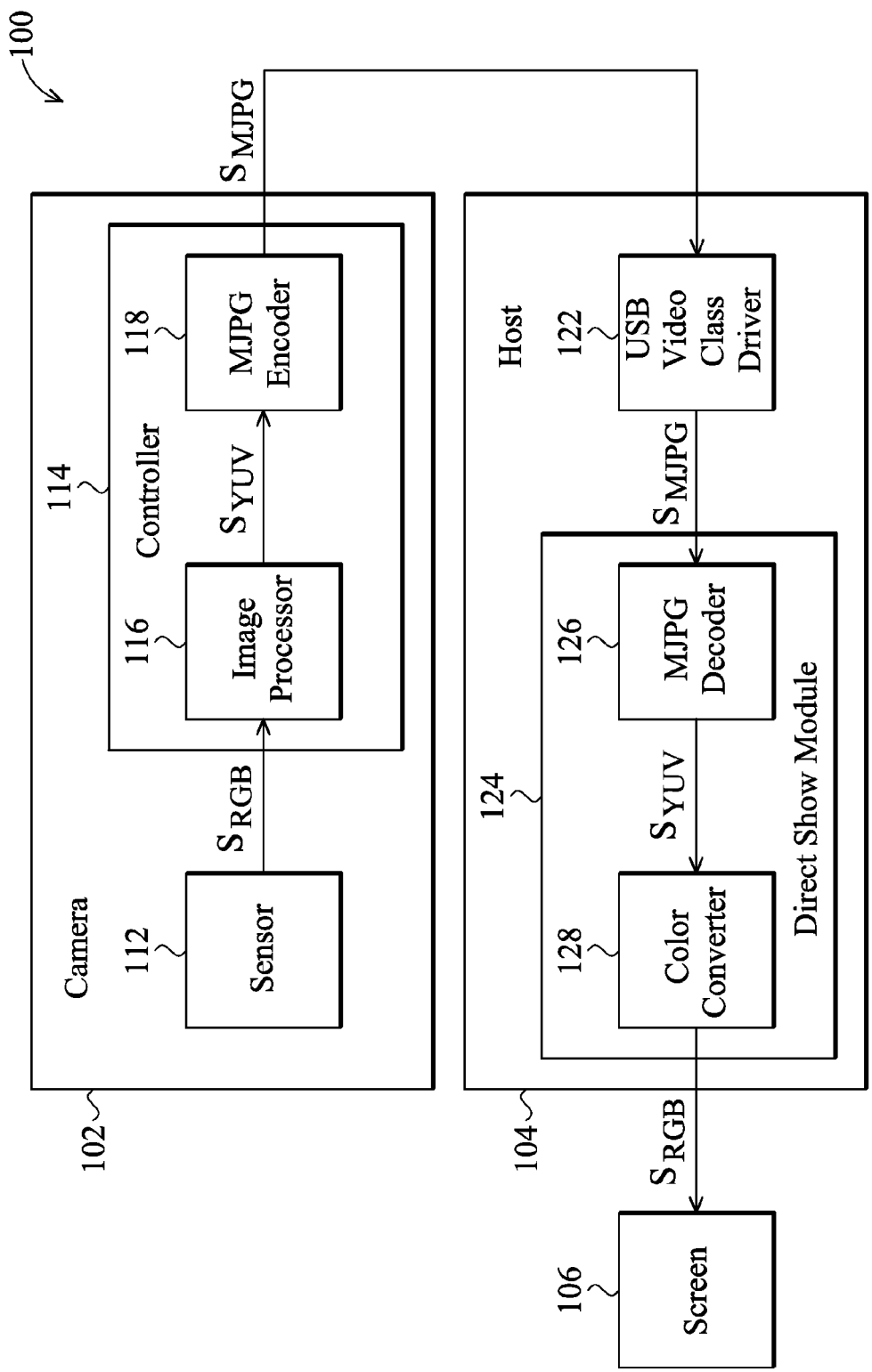
FIG. 1 is a block diagram of a camera device generating an image signal of an MJPG format and a host receiving the image signal.

Referring to FIG. 1, a block diagram of a camera device 102 generating an image signal of an MJPG format and a host 104 receiving the image signal is shown. The camera device 102 generates an image signal $S_{MJPG}$ of an MJPG format. In one embodiment, the camera device 102 comprises a sensor 112 and a controller 114. The sensor 112 detects an image to generate an image signal $S_{RGB}$ of a RGB format. The controller 114 comprises an image processor 116 and an MJPG encoder 118. The image processor 116 receives the image signal $S_{RGB}$ generated by the sensor 112, and converts the image signal $S_{RGB}$ to an image signal $S_{YUV}$ of a YUV format. The MJPG encoder 118 then receives the image signal $S_{YUV}$ generated by the image processor 116, and then compresses the image signal $S_{YUV}$ to obtain an image signal $S_{MJPG}$ of an MJPG format.

The camera device 102 then transmits the image signal $S_{MJPG}$ to a host 104. In one embodiment, an universal serial bus (USB) is coupled between the host 104 and the camera device 102 for data transmission. The universal serial bus is driven by a USB video class driver 122 of the host 104, and the image signal $S_{MJPG}$ is sent to the host 104 via the universal serial bus. The host 104 has a Windows operation system which comprises a Direct Show module 124 for playing the image signal $S_{MJPG}$. In one embodiment, the Direct Show module 124 comprises an MJPG decoder 126 and a color converter 128. The MJPG decoder 126 decodes the image signal $S_{MJPG}$ of an MJPG format to generate an image signal $S_{YUV}$ of a YUV format. The color converter 128 then converts the image signal $S_{YUV}$ to an image signal $S_{RGB}$ of a RGB format. Finally, the host 104 sends the image signal $S_{RGB}$ to a screen 106, and the screen 106 displays the image signal $S_{RGB}$.

Figure 2:
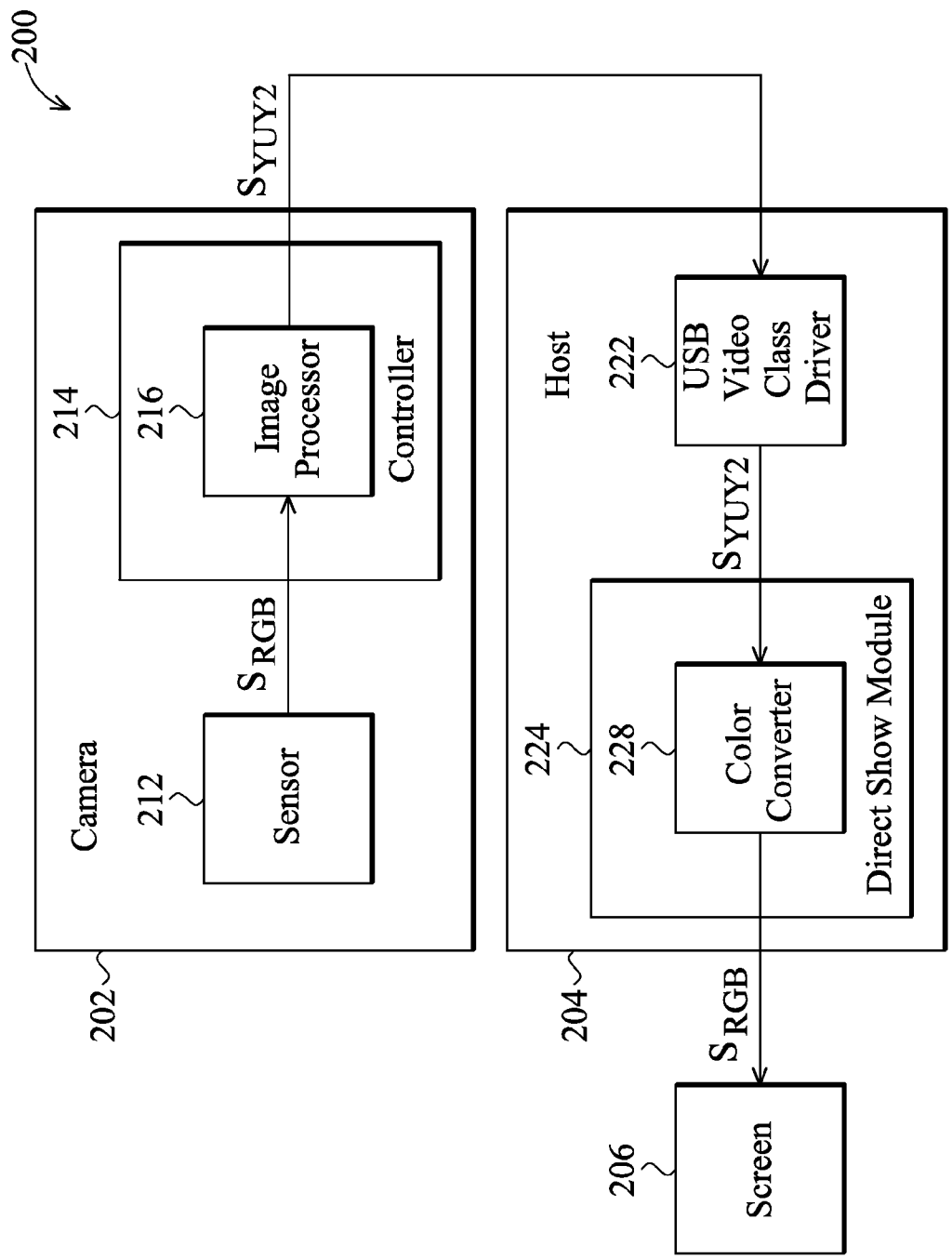
FIG. 2 is a block diagram of a camera device generating an image signal of a YUY2 format and a host receiving the image signal.

Referring to FIG. 2, a block diagram of a camera device 202 generating an image signal of a YUY2 format and a host 204 receiving the image signal is shown. The camera device 202 generates an image signal $S_{YUY2}$ of a YUY2 format. In one embodiment, the camera device 202 comprises a sensor 212 and a controller 214. The sensor 212 detects an image to generate an image signal $S_{RGB}$ of a RGB format. The controller 214 comprises an image processor 216. The image processor 216 receives the image signal $S_{RGB}$ generated by the sensor 212 and converts the image signal $S_{RGB}$ to an image signal $S_{YUY2}$ of a YUY2 format. The camera device 202 then sends the image signal $S_{YUY2}$ to the host 204.

Figure 3:
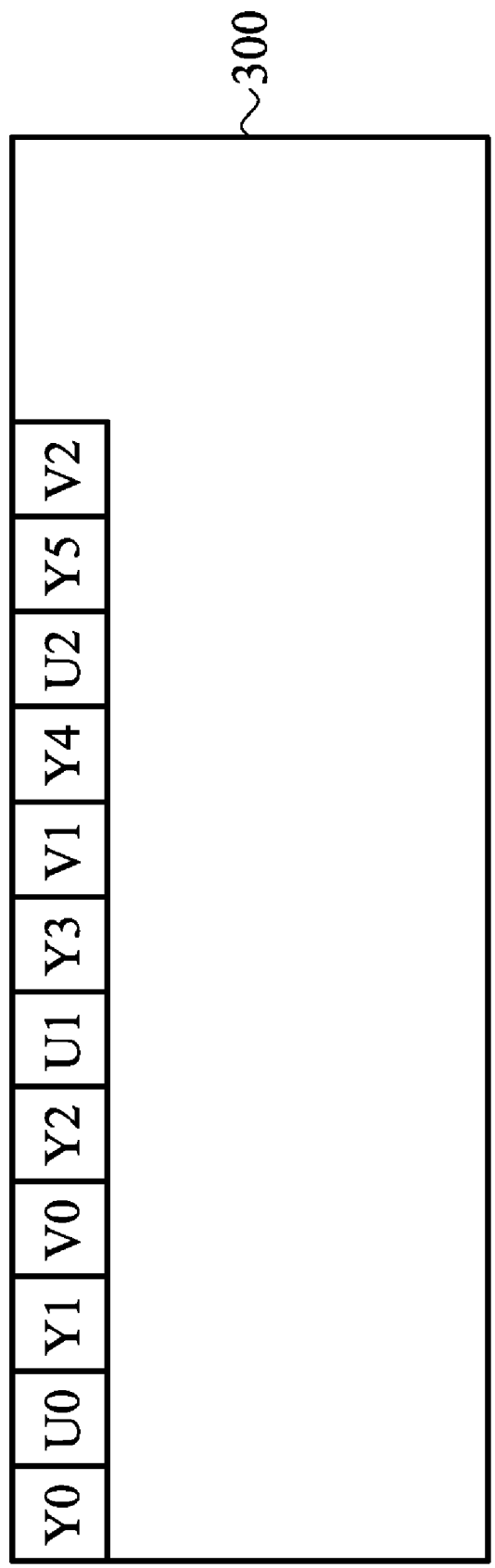
FIG. 3 is a schematic diagram of a frame of an image signal of a YUY2 format.

Referring to FIG. 3, a schematic diagram of a frame 300 of an image signal of a YUY2 format is shown. A pixel of the frame 300 of the YUY2 format is represented by a luma component Y, a first chroma component U, and a second chroma component V. The luma component Y indicates luminance of the pixel, and the chrominance of the pixel is indicated by both the first chroma component U and the second chroma component V. If all pixels of the frame 300 are represented by the luma component Y, the first chroma component U, and the second chroma component V, the total data amount of the frame 300 is massive. To reduce the total data amount of the frame 300, each pixel of the frame 300 of a YUY2 format comprises a luma component Y and a chroma component selected from U and V. For example, a first pixel of the frame 300 comprises a luma component Y0 and a first chroma component U0, and a second pixel of the frame 300 comprises a luma component Y1 and a second chroma component V0. When a frame 300 of a YUY2 format is displayed, the first chroma component U and the second chroma component V must be calculated according to an interpolation method.

In one embodiment, an universal serial bus (USB) is coupled between the host 204 and the camera device 202 for data transmission. The universal serial bus is driven by a USB video class driver 222 of the host 204, and the image signal $S_{YUY2}$ is sent to the host 204 via the universal serial bus. The host 204 has a Windows operation system which comprises a Direct Show module 224 for playing the image signal $S_{YUY2}$. In one embodiment, the Direct Show module 224 comprises a color converter 228 which converts the image signal $S_{YUY2}$ to an image signal $S_{RGB}$ of a RGB format. Finally, the host 204 sends the image signal $S_{RGB}$ to a screen 206, and the screen 206 displays the image signal $S_{RGB}$.

When the host 104 shown in FIG. 1 and the host 204 shown in FIG. 2 respectively display the image signal $S_{MJPG}$ of an MJPG format and the image signal $S_{YUY2}$ of a YUY2 format on the screens 106 and 206, the images shown on the screens 106 and 206 have different luminance and chrominance. Because the color converter 128 of the Direct Show module 124 and the color converter 228 of the Direct Show module 224 use different conversion coefficients to convert the image signals $S_{YUV}$ and $S_{YUY2}$ of different formats to the image signals $S_{RGB}$ of the RGB format, the image signals $S_{RGB}$ output by the color converters 128 and 228 have different luminance and chrominance. The color converter 128 converts the image signal $S_{YUV}$ to the image signal $S_{RGB}$ according to the following algorithm:

$$\begin{bmatrix} R \\ G \\ B \end{bmatrix} = \begin{bmatrix} 1 & 0 & 1.402 \\ 1 & -0.344 & -0.715 \\ 1 & 1.77 & 0 \end{bmatrix} \begin{bmatrix} Y \\ U-128 \\ V-128 \end{bmatrix}, \quad (1)$$

wherein Y, U, and V are respectively luma components, first chroma components, and second chroma components of the image signal $S_{YUV}$, and R, G, and B are respectively intensities of a red primary color, a green primary color, and a blue primary color of the image signal $S_{RGB}$. On the contrary, the color converter 228 converts the image signal $S_{YUY2}$ to the image signal $S_{RGB}$ according to the following algorithm:

$$\begin{bmatrix} R \\ G \\ B \end{bmatrix} = \begin{bmatrix} 1.164 & 0 & 1.598 \\ 1.164 & -0.391 & -0.813 \\ 1.164 & 2.016 & 0 \end{bmatrix} \begin{bmatrix} Y-16 \\ U-128 \\ V-128 \end{bmatrix}, \quad (2)$$

wherein Y, U, and V are respectively the luma components, the first chroma components, and the second chroma components of the image signal $S_{YUY2}$, and R, G, and B are respectively intensities of a red primary color, a green primary color, and a blue primary color of the image signal $S_{RGB}$. According to the algorithms (1) and (2), the conversion coefficients of the algorithm (2) are greater than the conversion coefficients of the algorithm (2). Thus, the image signal $S_{RGB}$ converted from the image signal $S_{YUY2}$ of a YUY2 format has a higher intensity than that of the image signal $S_{RGB}$ converted from the image signal $S_{YUV}$ of a YUV format.

Figure 4:
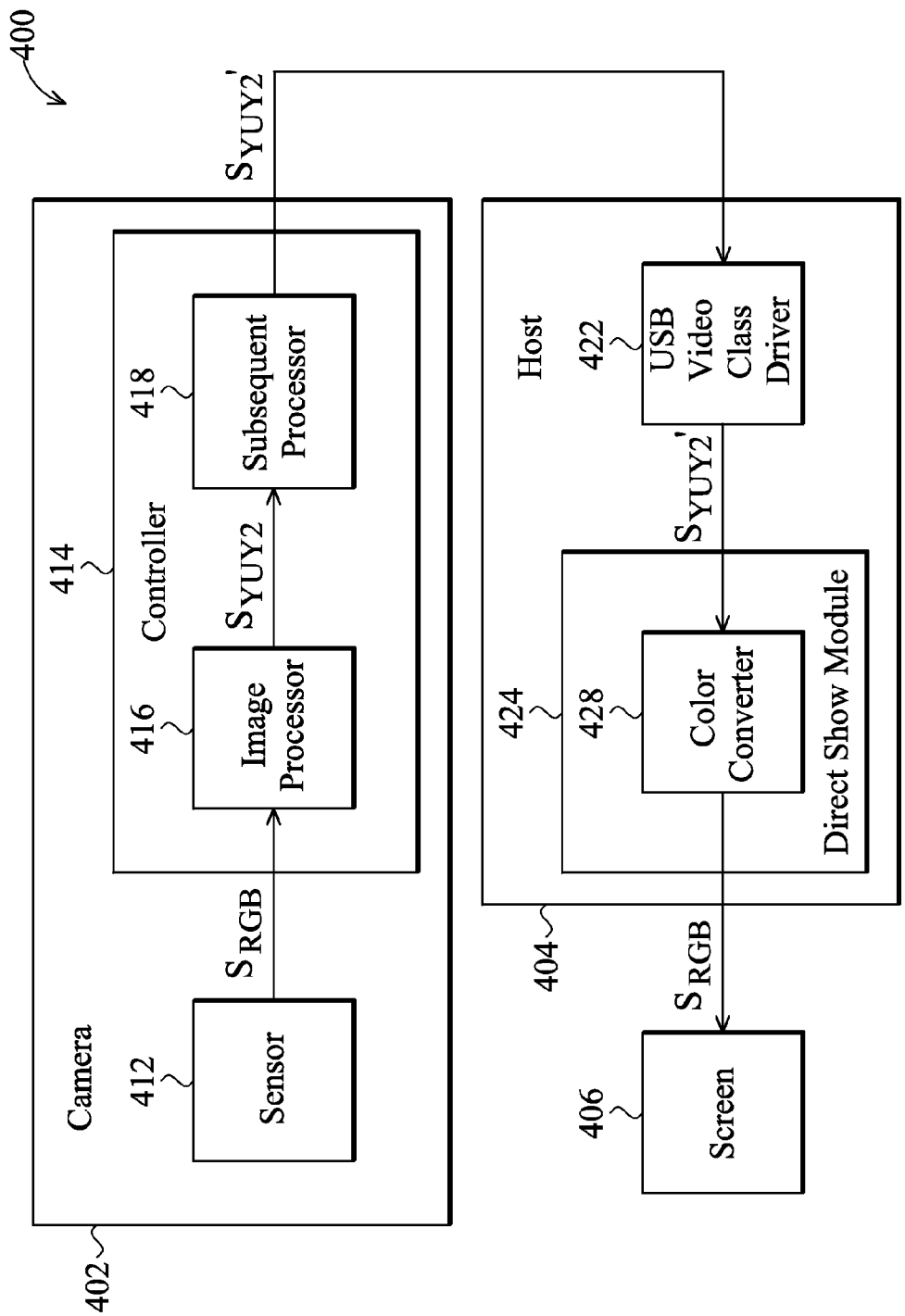
FIG. 4 is a block diagram of a camera device outputting an image signal of a YUY2 format and a host receiving the image signal according to the invention.
Figure 5:
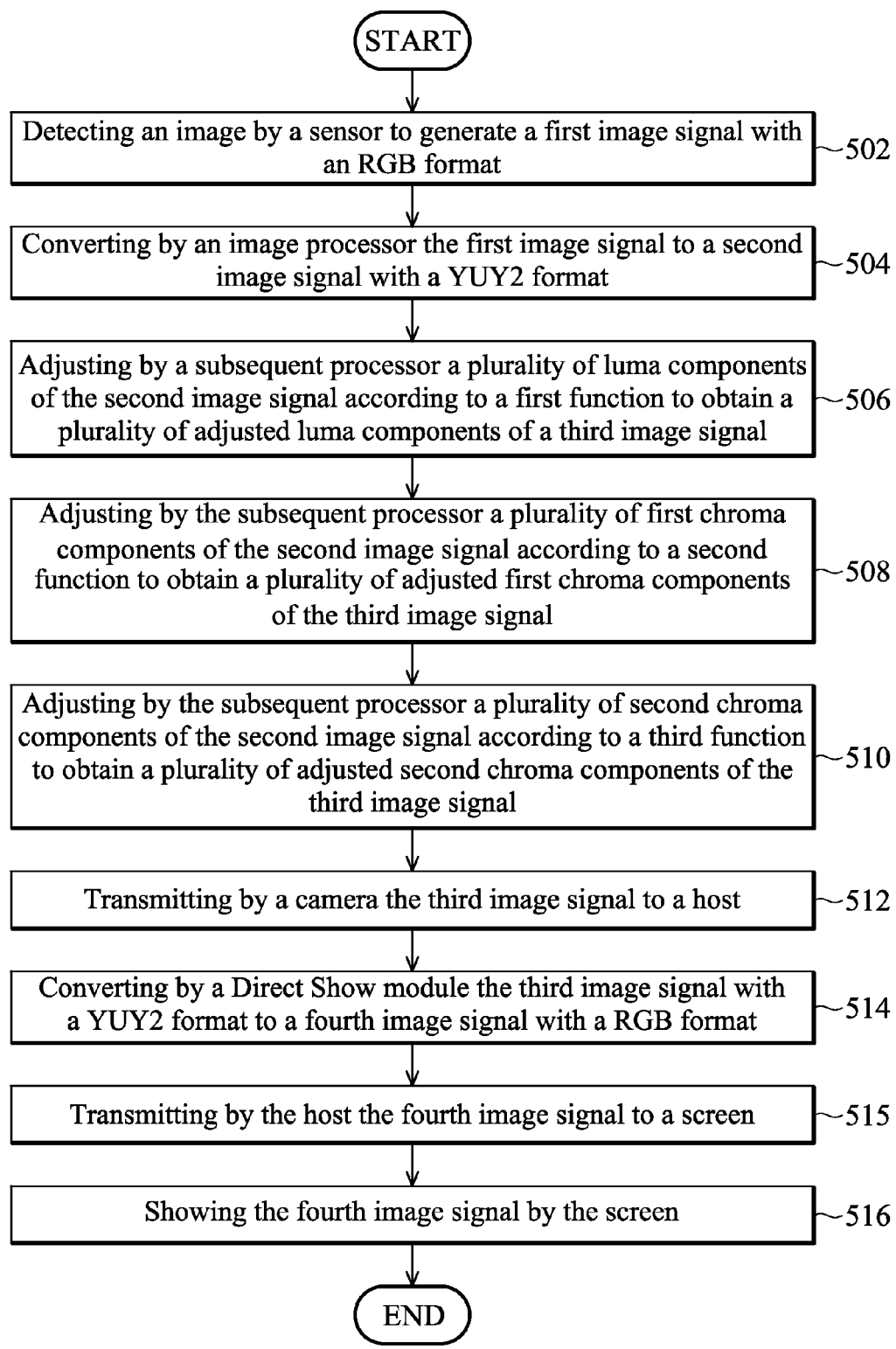
FIG. 5 is a flowchart of a method for processing image signals of the camera device and the host shown in FIG. 4 according to the invention.

To lower the intensity of the image signal $S_{RGB}$ converted from the image signal $S_{YUY2}$ of a YUY2 format, the invention provides a camera device which can adjust the luminance and chrominance of the image signal $S_{YUY2}$ of a YUY2 format before the image signal $S_{YUY2}$ is output. Referring to FIG. 4, a block diagram of a camera device 402 outputting an image signal of a YUY2 format and a host 404 receiving the image signal according to the invention is shown. Referring to FIG. 5, a flowchart of a method 500 for processing image signals of the camera device 402 and the host 404 shown in FIG. 4 according to the invention is shown. In one embodiment, the camera device 402 comprises a sensor 412 and a controller 414, and the controller 414 comprises an image processor 416 and a subsequent processor 418. The host 404 is identical to the host 204 shown in FIG. 2 and comprises a USB video class driver 422 and a Direct Show module 424.

First, the sensor 412 detects an image to generate a first image signal $S_{RGB}$ of a RGB format (step 502). The image processor 414 of the controller 414 then converts the first image signal $S_{RGB}$ to a second image signal $S_{YUY2}$ with a YUY2 format (step 504). The subsequent processor 418 then adjusts luma components and chroma components of the second image signal $S_{YUY2}$ generated by the image processor

416 to obtain a third image signal $S_{YUY2'}$. First, the subsequent processor 418 adjusts a plurality of luma components of the second image signal $S_{YUY2}$ according to a first function to obtain a plurality of adjusted luma components of the third image signal $S_{YUY2'}$ (step 506). The subsequent processor 418 then adjusts a plurality of first chroma components of the second image signal $S_{YUY2}$ according to a second function to obtain a plurality of first adjusted chroma components of the third image signal $S_{YUY2'}$ (step 508). The subsequent processor 418 then adjusts a plurality of second chroma components of the second image signal $S_{YUY2}$ according to a third function to obtain a plurality of second adjusted chroma components of the third image signal $S_{YUY2'}$ (step 510). In one embodiment, the first function is a linear function with variables of the luma components, the second function is a linear function with variables of the first chroma components, and the third function is a linear function with variables of the second chroma components. In one embodiment, the subsequent processor 418 adjusts the luma components and the chroma components of the second image signal $S_{YUY2}$ according to the following algorithm:

$$\begin{bmatrix} Y' \\ U' \\ V' \end{bmatrix} = \begin{bmatrix} 0.859 & 0 & 0 \\ 0 & 0.875 & 0 \\ 0 & 0 & 0.875 \end{bmatrix} \begin{bmatrix} Y+16 \\ U-128 \\ V-128 \end{bmatrix} + \begin{bmatrix} 0 \\ 128 \\ 128 \end{bmatrix}, \quad (3)$$

wherein Y, U, and V are respectively the luma components, the first chroma components, and the second chroma components of the second image signal $S_{YUY2}$, and Y', U', and V' are respectively the adjusted luma components, the first adjusted chroma components, and the second adjusted chroma components of the third image signal $S_{YUY2'}$.

The camera device 402 then transmits the third image signal $S_{YUY2'}$ to the host 404 (step 512). In one embodiment, a USB video class driver 422 of the host 404 drives a universal serial bus (USB), and the third image signal $S_{YUY2'}$ is transmitted via the universal serial bus. The Direct Show module 424 of the host 404 then converts the third image signal $S_{YUY2'}$ with a YUY2 format to a fourth image signal $S_{RGB}$ with a RGB format (step 514). Because the subsequent processor 418 has lowered the luminance and chrominance of the second image signal $S_{YUY2'}$ according to the algorithm (3), the color converter 428 can now convert the third image signal $S_{YUY2'}$ according to the algorithm (2) to obtain a fourth image signal $S_{RGB}$ comprising a red primary color, a green primary color, and a blue primary color with a lower intensity. The host 404 then transmits the fourth image signal $S_{RGB}$ to a screen 406 (step 515), and the screen 406 displays the fourth image signal $S_{RGB}$ (step 516). Because the subsequent processor 418 has adjusted the luminance and chrominance of the third image signal $S_{YUY2'}$ output by the camera device 402, an image displayed on the screen 406 has the same luminance and chrominance with an image derived from an image signal $S_{MJPG}$ with the MJPG format shown in FIG. 1.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera device, coupled to a host, comprising:
    a sensor, detecting an image to generate a first image signal with an RGB format; and
    a controller, comprising:
        an image processor, converting the first image signal to a second image signal with a YUY2 format; and
        a subsequent processor, adjusting a plurality of luma components, a plurality of first chroma components, and a plurality of second chroma components of the second image signal to obtain a plurality of adjusted luma components, a plurality of first adjusted chroma components, and a plurality of second adjusted chroma components of a third image signal,
    wherein the host receives the third image signal output by the camera, uses a Direct Show module to convert the third image signal to a fourth image signal with an RGB format, and outputs the fourth image signal to a screen.

2. The camera as claimed in claim 1, wherein the host receives a fifth image signal with a motion joint photographic experts group (MJPG) format, decodes the fifth image signal to obtain a sixth image signal with a YUV format, and uses the Direct Show module to convert the sixth image signal to a seventh image signal with an RGB format, wherein adjustment of the subsequent processor makes the luminance and chrominance of the fourth image signal equal to that of the seventh image signal.

3. The camera as claimed in claim 1, wherein the subsequent processor adjusts the luma components of the second image signal according to a first function to obtain the adjusted luma components of the third image signal, adjusts the first chroma components of the second image signal according to a second function to obtain the first adjusted chroma components of the third image signal, and adjusts the second chroma components of the second image signal according to a third function to obtain the second adjusted chroma components of the third image signal.

4. The camera as claimed in claim 3, wherein the first function is a linear function with variables of the luma components, the second function is a linear function with variables of the first chroma components, and the third function is a linear function with variables of the second chroma components.

5. The camera as claimed in claim 1, wherein the subsequent processor adjusts the second image signal to obtain the third image signal according to the following algorithm:

$$\begin{bmatrix} Y' \\ U' \\ V' \end{bmatrix} = \begin{bmatrix} 0.859 & 0 & 0 \\ 0 & 0.875 & 0 \\ 0 & 0 & 0.875 \end{bmatrix} \begin{bmatrix} Y+16 \\ U-128 \\ V-128 \end{bmatrix} + \begin{bmatrix} 0 \\ 128 \\ 128 \end{bmatrix},$$

wherein Y, U, and V are respectively the luma components, the first chroma components, and the second chroma components of the second? image signal, and Y', U', and V' are respectively the adjusted luma components, the first adjusted chroma components, and the second adjusted chroma components of the third image signal.

6. The camera as claimed in claim 1, wherein the Direct Show module converts the third image signal to the fourth image signal according to the following algorithm:

$$\begin{bmatrix} R \\ G \\ B \end{bmatrix} - \begin{bmatrix} 1.164 & 0 & 1.598 \\ 1.164 & -0.391 & -0.813 \\ 1.164 & 2.016 & 0 \end{bmatrix} \begin{bmatrix} Y-16 \\ U-128 \\ V-128 \end{bmatrix},$$

wherein Y, U, and V are respectively the adjusted luma components, the first adjusted chroma components, and the second adjusted chroma components of the third image signal, and R, G, and B are respectively intensities of a red primary color, a green primary color, and a blue primary color of the fourth image signal.

7. The camera as claimed in claim 2, wherein the Direct Show module converts the sixth image signal to the seventh image signal according to the following algorithm:

$$\begin{bmatrix} R \\ G \\ B \end{bmatrix} = \begin{bmatrix} 1 & 0 & 1.402 \\ 1 & -0.344 & -0.715 \\ 1 & 1.77 & 0 \end{bmatrix} \begin{bmatrix} Y \\ U-128 \\ V-128 \end{bmatrix},$$

wherein Y, U, and V are respectively a plurality of luma components, a plurality of first chroma components, and a plurality of second chroma components of the sixth image signal, and R, G, and B are respectively intensities of a red primary color, a green primary color, and a blue primary color of the seventh image signal.

8. The camera as claimed in claim 1, wherein a universal serial bus (USB) is coupled between the camera and the host, and the third image signal is transmitted from the camera to the host via the universal serial bus.

9. An image processing method, wherein a camera device is coupled to a host, comprising:
  detecting, by a sensor an image, to generate a first image signal with an RGB format;
  converting, by an image processor, the first image signal to a second image signal with a YUY2 format;
  adjusting, by a subsequent processor, a plurality of luma components, a plurality of first chroma components, and a plurality of second chroma components of the second image signal to obtain a plurality of adjusted luma components, a plurality of first adjusted chroma components, and a plurality of second adjusted chroma components of a third image signal; and
  transmitting the third image signal to the host,
  wherein the host receives the third image signal output by the camera, uses a Direct Show module to convert the third image signal to a fourth image signal with an RGB format, and outputs the fourth image signal to a screen.

10. The image processing method as claimed in claim 9, wherein the host receives a fifth image signal with a motion joint photographic experts group (MJPG) format, decodes the fifth image signal to obtain a sixth image signal with a YUV format, and uses the Direct Show module to convert the sixth image signal to a seventh image signal with an RGB format, wherein adjustment of the subsequent processor makes the luminance and chrominance of the fourth image signal equal to that of the seventh image signal.

11. The image processing method as claimed in claim 9, wherein adjustment of the second image signal comprises:
  adjusting, by the subsequent processor, the luma components of the second image signal according to a first function to obtain the adjusted luma components of the third image signal;
  adjusting, by the subsequent processor, the first chroma components of the second image signal according to a second function to obtain the first adjusted chroma components of the third image signal; and
  adjusting, by the subsequent processor, the second chroma components of the second image signal according to a third function to obtain the second adjusted chroma components of the third image signal.

12. The image processing method as claimed in claim 11, wherein the first function is a linear function with variables of the luma components, the second function is a linear function with variables of the first chroma components, and the third function is a linear function with variables of the second chroma components.

13. The image processing method as claimed in claim 9, wherein the second image signal is adjusted to obtain the third image signal according to the following algorithm:

$$\begin{bmatrix} Y' \\ U' \\ V' \end{bmatrix} = \begin{bmatrix} 0.859 & 0 & 0 \\ 0 & 0.875 & 0 \\ 0 & 0 & 0.875 \end{bmatrix} \begin{bmatrix} Y+16 \\ U-128 \\ V-128 \end{bmatrix} + \begin{bmatrix} 0 \\ 128 \\ 128 \end{bmatrix},$$

wherein Y, U, and V are respectively the luma components, the first chroma components, and the second chroma components of the second? image signal, and Y', U', and V' are respectively the adjusted luma components, the first adjusted chroma components, and the second adjusted chroma components of the third image signal.

14. The image processing method as claimed in claim 9, wherein the Direct Show module converts the third image signal to the fourth image signal according to the following algorithm:

$$\begin{bmatrix} R \\ G \\ B \end{bmatrix} - \begin{bmatrix} 1.164 & 0 & 1.598 \\ 1.164 & -0.391 & -0.813 \\ 1.164 & 2.016 & 0 \end{bmatrix} \begin{bmatrix} Y-16 \\ U-128 \\ V-128 \end{bmatrix},$$

wherein Y, U, and V are respectively the adjusted luma components, the first adjusted chroma components, and the second adjusted chroma components of the third image signal, and R, G, and B are respectively intensities of a red primary color, a green primary color, and a blue primary color of the fourth image signal.

15. The image processing method as claimed in claim 10, wherein the Direct Show module converts the sixth image signal to the seventh image signal according to the following algorithm:

$$\begin{bmatrix} R \\ G \\ B \end{bmatrix} = \begin{bmatrix} 1 & 0 & 1.402 \\ 1 & -0.344 & -0.715 \\ 1 & 1.77 & 0 \end{bmatrix} \begin{bmatrix} Y \\ U-128 \\ V-128 \end{bmatrix},$$

wherein Y, U, and V are respectively a plurality of luma components, a plurality of first chroma components, and a plurality of second chroma components of the sixth image signal, and R, G, and B are respectively intensities of a red primary color, a green primary color, and a blue primary color of the seventh image signal.

16. The image processing method as claimed in claim 9, wherein a universal serial bus (USB) is coupled between the camera and the host, and the third image signal is transmitted from the camera to the host via the universal serial bus.

* * * * *